UNITED STATES PATENT OFFICE.

FRITZ POLLAK, OF VIENNA, AUSTRIA.

PROCESS FOR THE MANUFACTURE OF CRYSTALLINE POLYMERIZATION PRODUCTS OF FORMALDEHYDE.

1,230,600.   Specification of Letters Patent.   Patented June 19, 1917.

No Drawing.   Application filed November 24, 1913. Serial No. 802,749.

*To all whom it may concern:*

Be it known that I, Dr. FRITZ POLLAK, a subject of the Emperor of Austria, residing at 178 Linke Wienzeile, Vienna, in the Empire of Austria, have invented certain new and useful Improvements in Processes for the Manufacture of Crystalline Polymerization Products of Formaldehyde, of which the following is a specification.

Auerbach and Barschall (see *Arbeiten aus dem Kaiserlichen Gesundheitsamt*, vol. 27, 1907) by treating formaldehyde solutions containing methyl alcohol or free from methyl alcohol with larger or smaller quantities of sulfuric acid have produced various crystalline modifications of para formaldehyde, which they term $\alpha$, $\beta$ and $\gamma$ polyoxymethylene. The method employed by these investigators for the production of such crystalline polymerization products of formaldehyde cannot be utilized technically, however, because it depends upon conditions which cannot be controlled with certainty so that the resultant products and yields are irregular. Furthermore the method of manufacturing formaldehyde solutions free from methyl alcohol as employed by Auerbach and Barschall and described for the production of $\alpha$- and $\beta$- polyoxymethylene, cannot be carried out upon a large scale. Finally the method described by them does not permit of employing the mother lyes in the next process, so that the cost would be excessive for production upon a large scale.

Now it has been discovered that it is readily possible in a simple manner to overcome the difficulties referred to if, instead of employing formaldehyde solutions as the primary substance, ordinary commercial amorphous para formaldehyde is used. If this para formaldehyde be dissolved in hot solutions of acids or of salts containing the radical $SO_3$, or if it be treated with such solutions in raising the temperature without complete dissolution and cooling is then allowed to take place (preferably gradually), according to the conditions prevailing, the various crystalline polymers of formaldehyde are obtained in an almost quantitative yield.

The following procedure can be adopted:

Example I: 500 parts by weight of dry amorphous para formaldehyde are dissolved in 680 parts by weight of sulfuric acid of 22.8 volume % at 90 to 95° C., filtered if desired, whereupon the solution is allowed to cool slowly. The cooled mass is then filtered, washed free from acid and dried at a low temperature. It consists of pure $\alpha$-polyoxymethylene. It is completely soluble in aqueous sodium sulfite solution but does not react exothermically with phenols without contact media.

Example II: 80 parts by weight of dry amorphous para formaldehyde are dissolved in 234 parts by weight of sulfuric acid of 51.5 volume % at 85° C. and in other respects treated in the manner described with reference to Example I. The product, which is completely soluble in aqueous sodium sulfite solution, reacts exothermically with phenols without addition of contact media whereby it characterizes itself as $\beta$-polyoxymethylene.

Example III: 125 parts by weight of amorphous dry para formaldehyde are dissolved in 318 parts by weight of sulfuric acid of 78.9 volume % at 85–90° C. and in other respects treated in the manner described in Example I. The product is insoluble in aqueous sodium sulfite solution and reacts exothermically with phenols without the addition of contact media. It therefore represents $\gamma$-polyoxymethylene.

The mother lyes precipitated in this process can of course be reintroduced into the process.

The products so obtained can be used as disinfectants as well as for the production of condensation products of phenols or amins.

What I claim and desire to secure by Letters Patent of the United States is:—

1. The process for the production of crystalline polymerization products of formaldehyde, which consists in treating amorphous para formaldehyde, at an elevated temperature and in the presence of water, with an acid compound containing the radical $SO_3$, allowing the mixture to cool slowly and separating the polymerid from the liquid.

2. The process for the production of crystalline polymerization products of formaldehyde, which consists in dissolving amorphous para formaldehyde in a hot watery solution of sulfuric acid, allowing the mixture to cool slowly and separating the polymerid from the liquid.

In testimony whereof I affix my signature in presence of two witnesses.

DR. FRITZ POLLAK.

Witnesses:
 AUGUST FUGGER,
 ADA MARIA BERGER.